Jan. 27, 1931. H. PRICE 1,790,484
ELECTRIC TOASTER
Filed Aug. 31, 1929
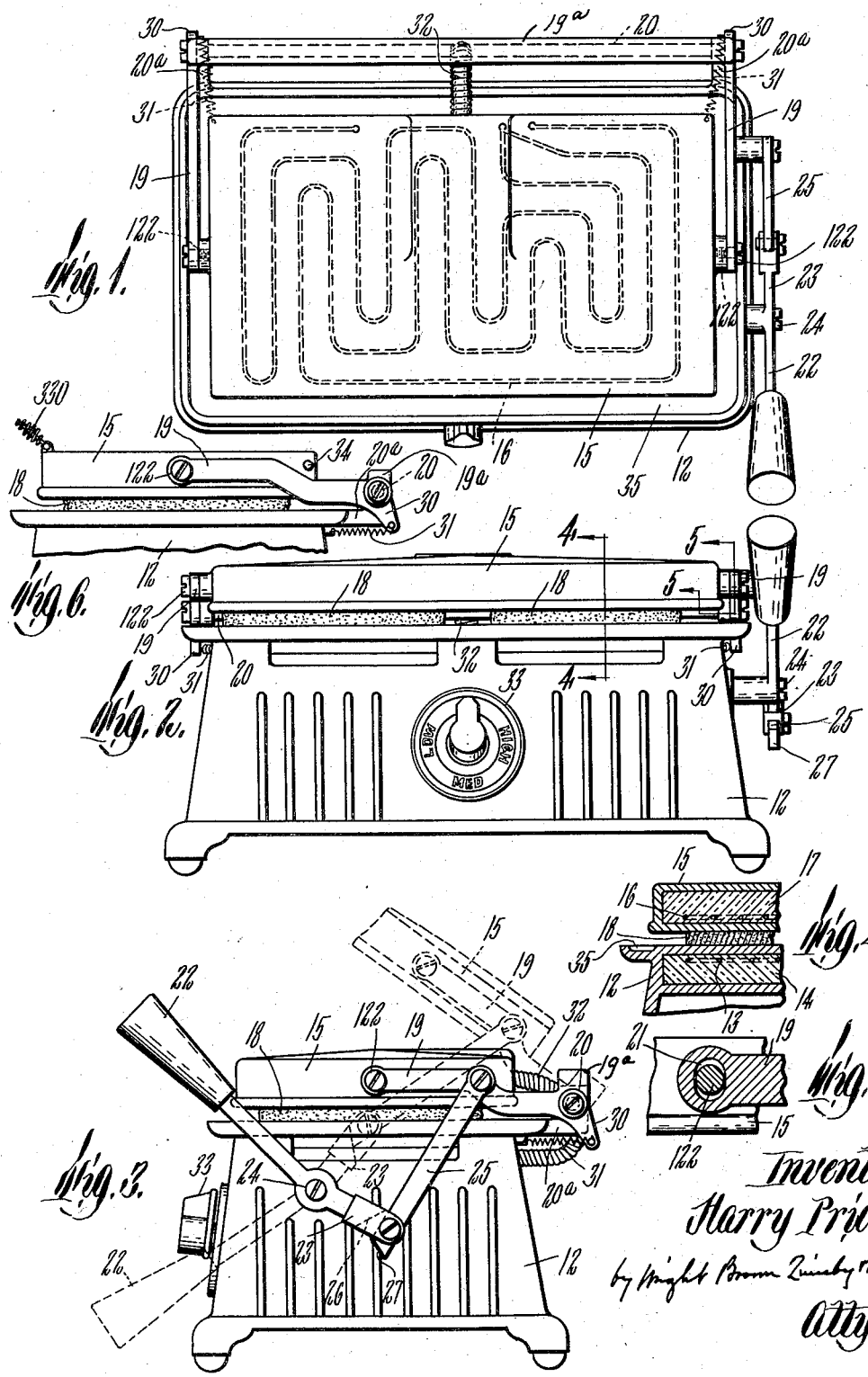
Inventor:
Harry Price,
by Wright Brown Quinby & Many
attys.

Patented Jan. 27, 1931

1,790,484

UNITED STATES PATENT OFFICE

HARRY PRICE, OF BOSTON, MASSACHUSETTS

ELECTRIC TOASTER

Application filed August 31, 1929. Serial No. 389,693.

This invention relates to an electrically heated device for toasting slices of material, such as bread, and particularly to toasters having large areas of heated toasting surface, and suitable for use in hotels and restaurants.

A toaster embodying the invention includes a base and a movable top, each having an electrically heated toasting face, the top being displaceable relative to the base, to permit sliced material to be placed on the latter, and movable to an operative position on the upper surface of the material.

The chief object of the invention is to provide simple and effective top controlling means causing the top, when in its operative position, to bear lightly on the material and conform automatically to the thickness thereof, without exerting objectionable compacting pressure on the material.

Of the accompanying drawings forming a part of this specification,—

Figure 1 is a top plan view of a toaster embodying the invention.
Figure 2 is a side view of the same.
Figure 3 is an end view.
Figure 4 is a fragmentary section on line 4—4 of Figure 2.
Figure 5 is a fragmentary section on line 5—5 of Figure 2.
Figure 6 is a fragmentary end view, similar to a portion of Figure 3, showing different means for displacing the top.

The same reference characters indicate the same parts in all of the figures.

In the drawings, 12 designates a base having an upwardly facing toasting face electrically heated by suitable means, such as resistance wires 13 (Figure 4), enclosed in a body 14 of insulating heat conducting material.

15 designates a movable top having a downwardly facing toasting face, electrically heated as by resistance wires 16, enclosed in an insulating heat conducting body 17.

The base and the top are connected by means permitting the top to be raised to permit the depositing of sliced material 18, such as bread, on the base and lowered to permit the bearing of the top on said material, as hereinafter described. Elements of said means are two spaced apart bell crank levers, each including a longer arm 19 and a shorter arm 30. Said levers are fulcrumed on the base and preferably on a pintle-rod 20, supported by ears 20a on the base. The bell crank levers are rigidly connected with each other, by a crossbar 19a, so that a swinging movement imparted to one lever is transmitted to the other, the levers moving in unison.

The top 15 is pivotally connected with the outer ends of the longer arms 19, preferably by trunnions 122 on the top entering orifices 21 in said arms, the orifices being elongated, as shown by Figure 5, so that the top is adapted to be inclined to conform its toasting face to a slice 18 whose surfaces are not parallel with each other. The bell crank levers are adapted to swing in vertical planes, as indicated by dotted lines in Figure 3, to raise the top.

To prevent the entire weight of the top from being exerted on a slice being toasted, I connect the shorter arms 30 of the bell crank levers with the base 12 by springs 31 adapted to yieldingly oppose downward movement of the top and prevent objectionable compressing pressure thereof on the slice. The springs 31 are tensioned when the top is in its operative position, so that they exert a pull on the lever arms 30, and an upward force on the lever arms 19, the result being that downward movement of the top 15 is yieldingly opposed, and its entire weight is not sustained by the slice, so that the density of the slice is not materially increased by the bearing of the top upon it.

The longer lever arms 19 may be swung upward and locked when the top is raised, by means including an operating lever composed of an outer arm 22, and an inner arm 23, pivoted at 24 to the base. The inner arm 23 is connected by a link 25 with one of the longer bell crank lever arms 19. When the top 15 is in its operative position, the outer arm 22 of the operating lever is raised and projects forward from one end of the toaster, the inner arm 23 being depressed. When the outer arm is depressed, the inner arm is raised, and the link 25 is caused to raise the connected bell crank lever arms 19 and the top 15, as shown by dotted lines in Figure 3. The inner arm 23 is provided with a face 26, shown by dotted lines in Figure 3, and the lower end of the link 25 is provided with a complemental face 27, which abuts the face 26 when the operating lever is moved to the dotted line position, so that the inner arm 23 and link 25 maintain the top 15 in a raised position until the longer arm 22 is forcibly moved to the full line position shown by Figure 3.

The resistance wires 13 and 16, are suitably connected in a heating circuit which includes conducting wires in a flexible cable 32, and a controlling switch designated as a whole by 33.

Figure 6 shows portions of a toaster which embodies the construction above described, excepting the operating lever and the link 25, which are omitted, the top being provided with a handle 330, whereby it may be raised and lowered. When the top is raised by the handle, studs 34 on the top 15, bear on the longer bell crank lever arms 19, so that the top and the bell crank levers are swung together or in unison by the handle.

The toaster may be used for broiling or frying meat and other comestibles.

The toasting face of the base may be surrounded by a gutter 35, shown in plan by Figure 1, and in section by Figure 4, to receive melted fat.

It will now be seen that the bell-crank levers, fulcrumed on the base 12, the cross-bar 19a rigidly connecting said levers, the pivotal connections between the top 15 and the longer arms 19 of said levers, and the springs 31 connecting the shorter bell-crank lever arms 30 with the base 12, constitute a simple top controlling means permitting movements of the top toward and from the base and automatic conformation of the top toasting face to material on the bottom toasting face, said means also preventing compacting pressure on said material

I claim:—

A toaster comprising a base having an upwardly facing toasting face, a top having a downwardly facing toasting face, and top-controlling means permitting movements of the top toward and from the base, and automatic conformation of the top toasting face to material on the bottom toasting face, and preventing compacting pressure on said material, said means including a pair of bell-crank levers fulcrumed on the base and having longer and shorter arms, a cross-bar rigidly connecting said levers so that they move in unison, pivotal connections between the top and the longer lever arms causing vertical movements of the top with the levers and permitting rocking movements of the top, and springs connecting the shorter lever arms with the base, and exerting pressure on the levers yieldingly opposing downward movement of the longer arms and the top.

In testimony whereof I have affixed my signature.

HARRY PRICE.